United States Patent [19]

Frazita

[11] Patent Number: 4,837,580

[45] Date of Patent: Jun. 6, 1989

[54] MICROWAVE LANDING SYSTEM WITH FAIL-SOFT SWITCHING OF DUAL TRANSMITTERS, BEAM STEERING AND SECTOR ANTENNAS

[75] Inventor: Richard F. Frazita, St. James, N.Y.

[73] Assignee: Hazeltine Corporation, Greenlawn, N.Y.

[21] Appl. No.: 49,741

[22] Filed: May 14, 1987

[51] Int. Cl.[4] .......................... H01Q 3/02; H01Q 3/12
[52] U.S. Cl. ..................................... 342/374; 342/372; 342/408
[58] Field of Search ............... 342/368, 372, 373, 374, 342/408, 410, 412, 413; 455/101, 103

[56] References Cited

U.S. PATENT DOCUMENTS

| | | |
|---|---|---|
| 3,964,066 | 6/1976 | Nemit . |
| 4,037,173 | 7/1977 | Toman ................................ 342/412 |
| 4,123,759 | 10/1978 | Hines et al. . |
| 4,178,581 | 12/1979 | Willey, Sr. ........................ 342/408 |
| 4,186,398 | 1/1980 | Minnett et al. . |
| 4,301,533 | 11/1981 | Acampora et al. ................ 455/103 |

Primary Examiner—Theodore M. Blum
Attorney, Agent, or Firm—Onders E. A.

[57] ABSTRACT

An MLS system having redundant subsystems. Dual signal sources feed dual power dividers. A first switch array selects the power divider to be used and provides the selected signals to an array of phase shifters. A second switch array provides the phase shifted signal, which may be amplified, to either a primary array having elements for radiating a scanning beam or a recombining network having outputs connected to auxiliary antennas. A third switch array provides control signals to the array of phase shifters from either a main beam steering unit or a standby beam steering unit. Alternatively, the dual signal sources feed a single power divider through a circulator. Duplicate auxiliary antennas may be used with antenna switches located before the power dividers or circulator for selectively providing the signals to the auxiliary antennas instead of the primary array.

37 Claims, 6 Drawing Sheets

MICROWAVE LANDING SYSTEM WITH FAIL-SOFT SWITCHING OF DUAL TRANSMITTERS, BEAM STEERING AND SECTOR ANTENNAS

BACKGROUND OF THE INVENTION

1. Field of the Invention

The invention generally relates to scanning antennas and, in particular, to microwave landing systems using a signal format which requires multiple antenna functions to provide the signals over wide coverage sectors.

2. Description of the Prior Art

Antenna techniques are known which use the phased array scanning beam antenna of a microwave landing system (MLS) to broaden its radiation pattern to satisfy the data antenna requirements. Such techniques generally employ phase spoiling of the phased array aperture. The fundamental limitation of this technique is that it cannot provide the out-of-coverage indications (OCI) signals and the 360° data signals without employing a single thread multiple port rf switch. This technique is deficient because it is subject to single point failure within the phased array which can cause substantial radiation pattern minima when used in the data antenna mode (low gain - broad pattern). These minima are very difficult, if not practically impossible, to monitor and detect. In addition, single point system failures also exist and can create significant safety risks in certain operational scenarios.

The MLS signal format requires multiple antenna functions to provide the signals over wide coverage sectors. The format also provides for signal transmission outside the normal coverage volume, e.g., out-of-coverage indication signals (OCI). Inherent growth capabilities in the system such as 360 data link coverage, also require additional antennas in many practical applications. Because of the multiple antennas required for MLS, an antenna switch is used to connect a transmitter sequentially in time to each antenna port. Although redundant transmitters and control electronics can be enacted on line to provide signal continuity in the event of a failure, the switching components (rf and logic) are a limiting factor in supporting the requirements for signal continuity in high reliability applications.

SUMMARY OF THE INVENTION

It is an object of this invention to provide an MLS employing redundant rf switching of dual signal sources to minimize the effect of switch failures.

It is another object of this invention to provide an MLS system with dual signal sources connected to a primary element array via a passive circulator and switch combination which permits continued operation even during failure (i.e. fail-operational).

It is another object of this invention to provide an MLS system with rf and beam steering logic switch arrays for eliminating single point failures.

It is another object of this invention to provide a microwave landing system with a recombining network and switch array for driving auxiliary wide sector antennas with fail-soft performance.

The antenna system according to the invention radiates wave energy signals into a selected region of space and in a desired radiation pattern. The system includes means for supplying wave energy signals and a primary aperture comprising an array of primary antenna elements. An auxiliary aperture comprising an array of auxiliary antennas is also provided. Recombining means may be used for recombining supplied wave energy signals and for supplying the recombined signals to the auxiliary aperture. First means phase shifts the supplied wave energy signals. Second means selectively couples phased signals provided by the first means to either the primary antenna elements or to the recombining means. The first means provides a beam radiated by the primary array in accordance with a predetermined pattern when said second means couples phased signals to the primary array. The second means also provides a beam which is radiated by at least one of the auxiliary antennas when the first means couples supplied wave energy signals to the recombining means.

The means for supplying may be comprised of means for supplying first wave energy signals and means for supplying second wave energy signals. The means for supplying second wave energy signals is independent of the means for supplying first wave energy signals. Third means selectively couples one of either the first wave energy signals or the second wave energy signals to the first means. The first means may be comprised of an array of phase shifters, a first beam steering unit for controlling the phase shifters and a second beam steering unit, independent of the first beam steering unit, for controlling the phase shifters. Fourth means selectively couples one of either the first beam steering unit or the second beam steering unit to the array of phase shifters.

For a better understanding of the present invention, together with other and further objects, reference is made to the following description, taken in conjunction with the accompanying drawings, and its scope will be pointed out in the appended claims.

DETAILED DESCRIPTION OF THE INVENTION

The standards specified by the Federal Aviation Administration and the International Civil Aviation Organization (ICAO) define the operational reliability requirements for the various levels of MLS. The most reliable level defined by the standards is known as category III. In category III systems it is necessary to have redundant operation of various subsystems in order to meet the operational requirements and avoid a break in the signal continuity because of critical failures. The MLS signal format requires multiple antenna functions to provide the signals over the nominal coverage limits. The format also provides for signal transmission outside the normal coverage volume, for example, OCI—out-of-clearance indication. Inherent growth capabilities in the system, such as 360° data transmission, also require additional antennas in practical applications. The multiple antennas required for MLS result in the use of antenna switches for connecting the transmitter sequentially in time to each antenna port. Redundant transmitters and control electronics can be employed on line to provide signal continuity in the event of a failure. However, a switching component (rf and logic) is a fundamental aspect which cannot be practically duplicated. This presents a limiting factor in supporting the requirements for signal continuity in Category III applications.

In accordance with the invention, this dependency on the need to use a switching component to connect auxiliary antennas may be minimized by using a recombining network. The network recombines the power which would have been radiated by each element in the phased array of the primary aperture. The power is recombined into a multiplicity of beam ports which are connected to auxiliary antennas such as data antennas, OCI antennas, clearance antennas and C-Band synchronization antennas. The technique employs a single-pole, double-throw (SPDT) switching component at the output of each phase shifter in the array in order to create a switch mechanism which is inherently redundant and which fails soft.

Furthermore, it is necessary to have independent, redundant transmitters and beam steering units (BSUs) in order to meet operational requirements. In the past, such transmitters and BSUs were each connected through a single switch so that when one failed, the other would be selected. An inherent flaw in this connection approach is that even though the transmitters and BSUs are redundant, the dwitch is not and a switch failure results in a critical system failure. The invention distributes the switching of the redundant transmitters and of the BSUs so that such switching is not dependent on any one switch. Alternatively, a circulator and switch may be used to link the redundant transmitter to the phased array in a fail-operational configuration.

Figure 1:
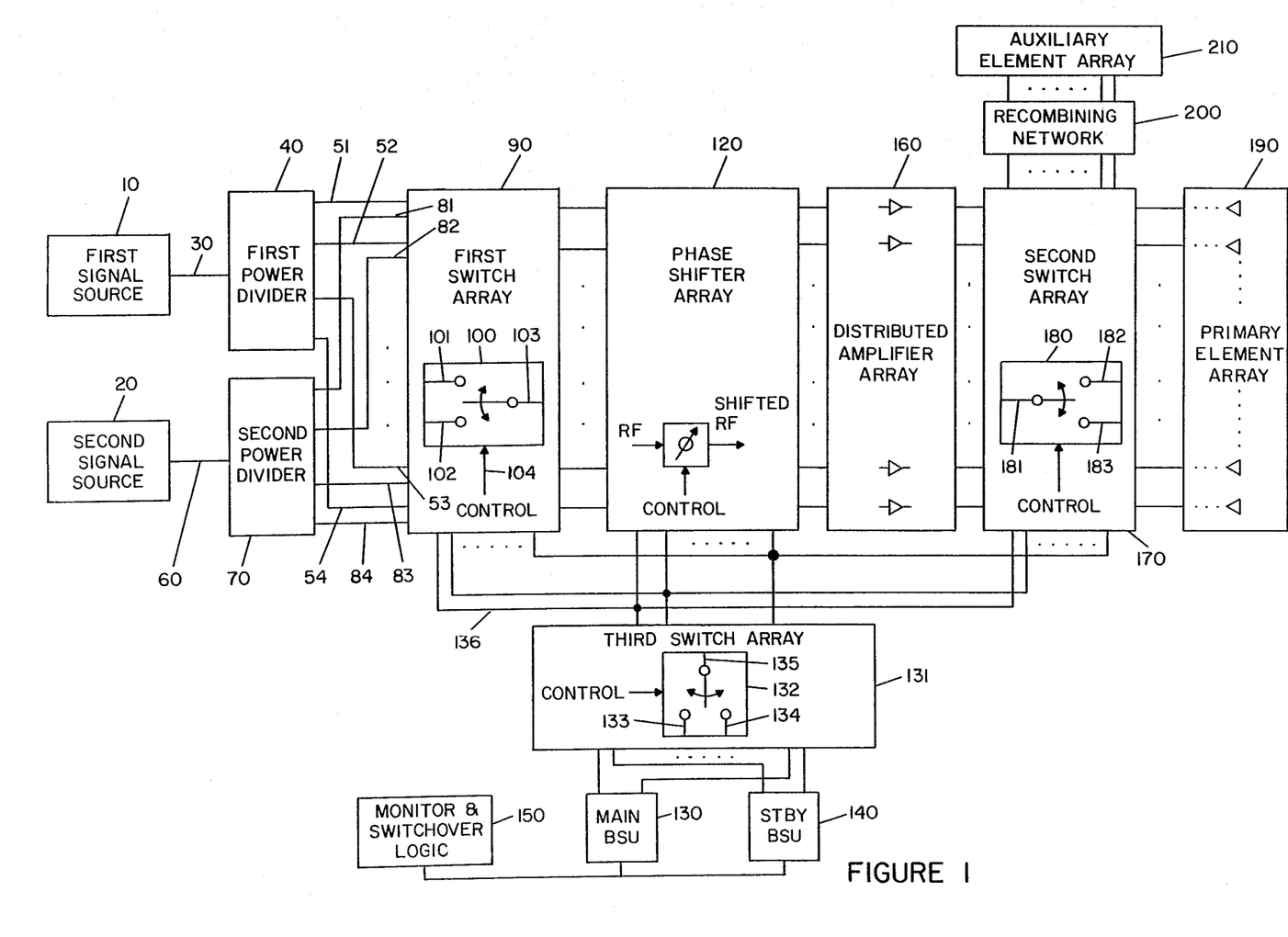
FIG. 1 is a block diagram of a microwave landing system (MLS) according to the invention including dual signal sources and a recombining network for driving auxiliary antennas.

Referring to FIG. 1, the redundant transmitters are illustrated by the first signal source 10 and second signal source 20 which is independent of the first signal source 10. The first signal source 10 provides its signal via line 30 to first power divider 40 which distributes the signal to various outputs 51, 52, 53, 54 of the first power divider 40. Similarly, second signal source 20 provides its signal via line 60 to second power divider 70 which distributes the provided signal to its various outputs 81, 82, 83, 84. The outputs of power dividers 40 and 70 are provided to a first switch array 90.

Switch array 90 is a group of single-pole, double-throw switches 100. Each SPDT switch 100 has inputs 101 and 102 with a single output 103. The position of each switch is controlled by either the main beam steering unit (BSU) 150 or standby BSU 140. Generally, each input 101 of each SPDT switch 100 would be connected to one of the outputs 51, 52, 53, 54 of first power divider 40. The corresponding input 102 of SPDT switch 100 would be connected to one of the corresponding outputs 81, 82, 83, 84 of second power divider 70. In normal operation, the first signal source would be selected and would provide power to the system via the first power divider 40 and all SPDT switches 100 would be in the UP position so that each input 101 would be connected to switch output 103. Upon detection of a failure in the first signal source 10, BSU 150 would operate the SPDT switches 100 via control 104 and move each switch 100 to the DOWN position so that input 102 would be connected to switch output 103. This would result in the second signal source 20 via power divider 70 providing the necessary rf power to the MLS. As a result, failure of one of the SPDT switches 100 does not totally disable the MLS and would only affect the particular port through which the failed switch is connected.

The outputs of first switch array 90 are connected to phase shifter array 120 for controlling the scanning of the radiated beam in response to controls provided by either BSU 130 or standby BSU 140 via third switch array 131. Switch array 131 is a group of single pole, double throw switches 132. Each SPDT switch 132 has inputs 133, 134 with a single output 135. The position of each switch is controlled by either the main BSU 130 or standby BSU 140. Generally, each input 133 of each SPDT switch 132 would be connected to one of the outputs of main BSU 130. The corresponding input 134 of SPDT switch 132 would be connected to one of the corresponding outputs of standby BSU 140. In normal operation, the main BSU 130 would be selected and would provide control signals to phase shifter array 120. All SPDT switches 132 would be in the LEFT position so that each input 133 would be connected to switch output 135. Upon detection of a failure of the main BSU 130, monitor and switchover logic 150 would operate the SPDT switches 132 and move each to the RIGHT position so that input 134 would be connected to switch output 135. This would result in the standby BSU 140 providing control signals to phase shifter array 120. As a result, failure of any one of the SPDT switches 132 does not create a single point system failure and cannot totally disable the MLS. A switch failure would only affect the particular phase shifter with which the failed switch is associated.

Figure 2:
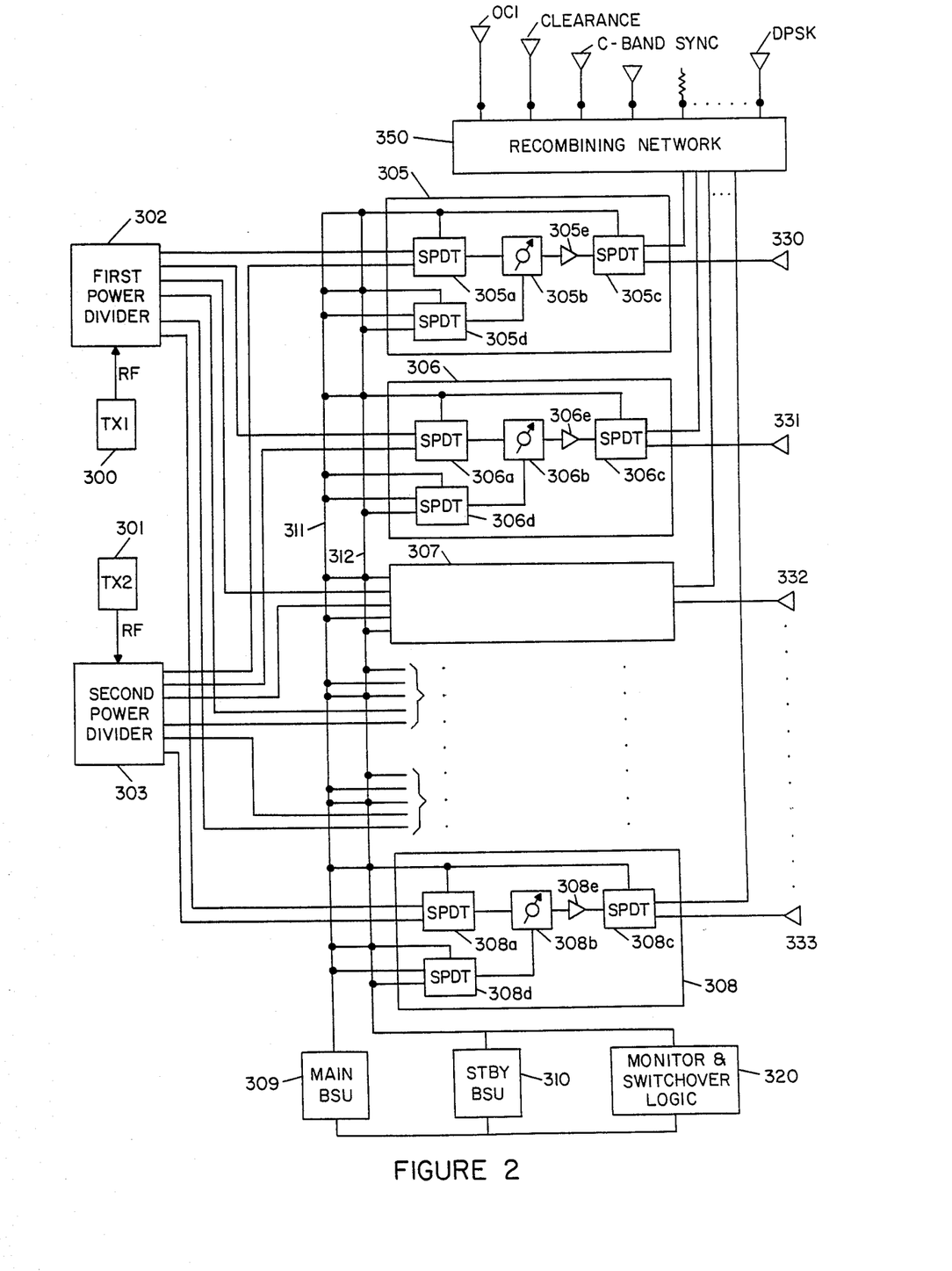
FIG. 2 is a detailed block diagram of one preferred embodiment of the MLS illustrated in FIG. 1.

Generally, control of the system operation would be under main BSU 130 in coordination with monitor and switchover logic 150. Logic 150 is constantly analyzing various monitor outputs provided by one or more monitors (not shown). As shown in FIG. 1, each BSU 130, 140 controls the first switch array 90, the second switch array 170 (described below) and the third switch array 131. The controls are illustrated in this manner because, as shown in FIG. 2, this facilitates a modular configuration. There may also be a requirement for redundancy (not illustrated) with regard to monitors 150.

The outputs from phase shifter array 120 which include phase shifted signals are then provided via distributed amplifier array 160 to second switch array 170. Amplifier array 160 is a plurality of in-line amplifiers, one for each output port of the phase shifter array 120. Switch array 170 is a group of single pole, double throw switches 180. Each switch has an input 181 and two outputs 182, 183. Each output 182 is connected to a corresponding element of the primary element array 190 to power the primary antenna elements for providing a scanning MLS beam. Each output 183 is connected to the corresponding input of recombining network 200 for powering the auxiliary antenna elements. The position of each SPDT switch 180 of second switch array 170 is controlled by BSU 130 or BSU 140 via third switch array 131. In the DOWN position, each SPDT switch 180 powers the primary element array 190 via output 183. In the UP position, each SPDT switch 180 powers the recombining network 200 via output 182.

As with the first switch array 90, the second switch array permits supplied energy signals to be either supplied to the primary element array 190 or to the auxiliary element array 210 without the supplying of such signals being dependent upon any one single-pole, double-throw switch or being subject to any single point failure.

An MLS generally has several modes of operation. In one mode, a TO-FRO beam is scanned in order to provide aircraft within the scanning beam azimuth or elevation information. In other modes of operation, auxiliary antennas radiate signals which provide supplemental landing information. Primary element array 190 includes a plurality of antenna elements which, when supplied by wave energy signals, provide a beam of radiated energy. The beam is electronically scanned TO and FRO by varying the phase of the input signals to the antenna elements. The phase is varied by phase shifters 120.

During auxiliary operation, one or more auxiliary antennas radiate information. Auxiliary element array 210 is a grouping of various auxiliary antennas which are used to provide the supplemental information to aircraft within the range of the MLS. In the prior art, auxiliary antennas are generally powered directly by the signal source. As indicated above, an antenna switch is used to select the particular antenna or group of antennas which are connected to the signal source. As a result, the reliability of the auxiliary antenna operation is dependent upon the single antenna switch which selects the antenna and connects it to the signal source.

In contrast, the invention employs a second switch array 170 which supplies power to a recombining network 200 to feed the auxiliary element array 210. During auxiliary operation of the MLS, each SPDT switch 180 is in the DOWN position so that supplied signals are provided to recombining network 200. The number of inputs to recombining network 200 equals the number of inputs to primary element array 110. The number of outputs to recombining network 200 depends upon the number of elements in the auxiliary element array and may be, for example, four or eight. Recombining network 200 is any standard network, such as a Blass or Butler array, which recombines the signals at the input according to a predetermined coupling arrangement and provides the combined signals at the outputs of the network 200.

During auxiliary operation, the beam steering unit 130 controls the phase shifters 120 so that the phase of the signals input into the recombining network 200 result in illuminating the particular output of network 200 which is connected to the particular auxiliary antenna of array 210. For example, assume that the OCI auxiliary antenna must be illuminated. Also, assume that the OCI antenna is connected to the first output port of recombining network 200. Since the characteristics of the recombining network are known and the coupling arrangement within the network preset, appropriate illumination of the inputs of network 200 will result in output 1 being primarily illuminated. In this way, the operation of each auxiliary antenna is not dependent on any single antenna switch.

FIG. 2 illustrates one preferred embodiment of the invention of FIG. 1. Dual signal sources 300 and 301 separately feed dual power dividers 302, 303. In particular, a first transmitter (TX1) feeds the first power divider 302 and a second transmitter (TX2) feeds the second power divider 303. The outputs of each of the power dividers is connected to the input to one of the modules 305-308 which includes a single pole, double throw switch 305a-308a, a phase shifter 305b-308b, a second single pole, double throw switch 305c-308c and a third single pole, double throw switch 305d-308d. Modules 305-308 comprise the combination of first switch array 90, phase shifters 120, second switch array 170 and third switch array 131 as illustrated in FIG. 1. Main BSU bus 311 provides the control signals between main BSU 309 and each of the SPDT switches. Main BSU bus 311 also provides one of the input signals to SPDT 305d-308d. Standby BSU bus 312 provides switch control signals and the other input signal to SPDT 305d-308d. For simplicity, connectors to the switches from the BSUs are illustrated as buses. However, each SPDT may be directly connected to a separate port of the BSU.

Single pole, double throw switches 305a-308a correspond to the first switch array 90 of FIG. 1. Switches 305c-308c correspond to the second switch array 170. Switches 305d-308d correspond to the third switch array 131. Phase shifters 305b-308b correspond to phase shifter array 120. Amplifiers 305e-308e correspond to the distributed amplifier array 160. Elements 330-333 correspond to the primary element array 190.

Operation of the preferred embodiment illustrated in FIG. 2 is as follows. During scanning cycles, main BSU 309 instructs the switches via bus 311. Switches 305a-308a are placed in the UP position, switches 305c-308c are placed in the DOWN position and switches 305d-308d are placed in the UP position. This results in transmitter 300 providing signals via the first power divider 302 to the primary antenna elements 330-333. In addition, phase shifters 305b-308b receive control signals from the main BSU 309 via bus 311 which result in the scanning of the beam radiated by elements 330-333. During auxiliary modes, main BSU 309 would place switches 305c-308c in the UP position. This would result in supplied wave energy signals being provided to recombining network 350. In addition, main BSU 317 would control phase shifters 305b-308b so that the phased signals being provided to recombining network 350 would illuminate the appropriate auxiliary antenna port. This aspect of the invention is described in more detail below. In contrast, during scanning modes, main BSU is adjusting the phase shifter 305b-308b to radiate a scanning beam via the primary array of elements 330-333.

In the event of a failure, monitor and switchover logic 320 would evaluate the failure and correct the problem. Logic 320 may be advised of a failure via field monitors, inherent monitors within the system, information derived from built in test equipment or from information provided by external sources. For example, if primary signal source 300 were inoperative, main BSU 309 would instruct SPDT switches 305a-308a to switch to the DOWN position. This instruction would be provided via main bus 311 so that power divider 303 would be supplying the input signals via secondary source 301. If a failure in the main beam steering unit 317 is detected, standby BSU 310 controls switches 305d-308d and places the switches in the DOWN position so that standby BSU 310 is providing control signals via bus 312 to phase shifters 305b-308b.

Figure 3:
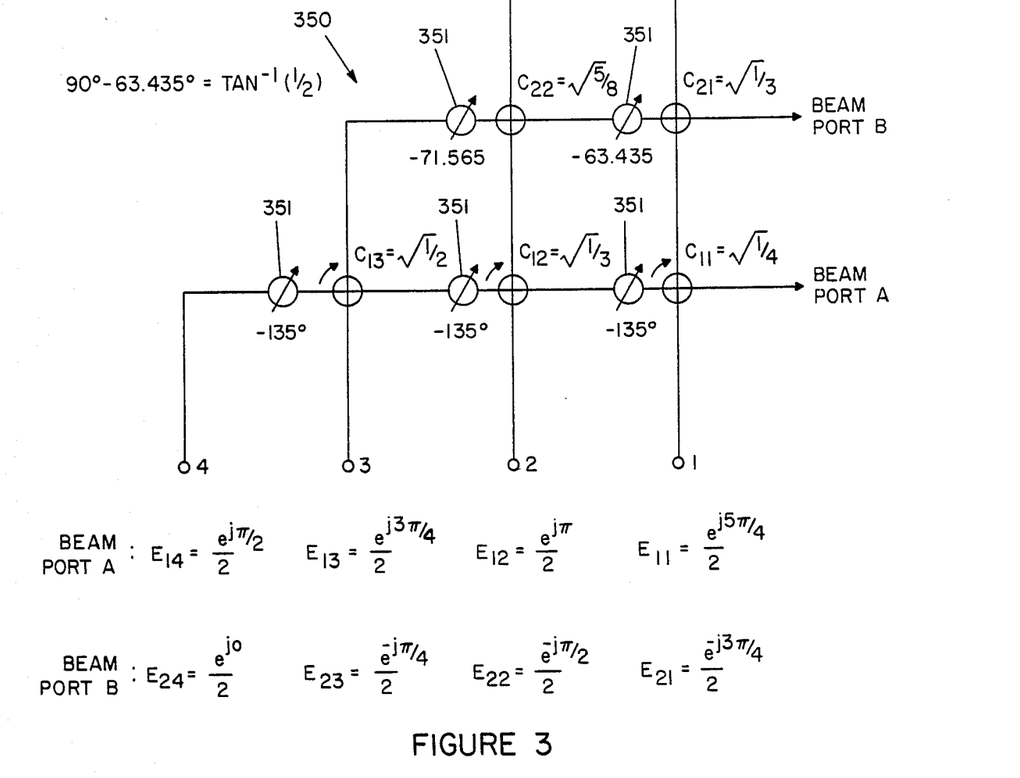
FIG. 3 is a schematic illustration of a Butler matrix for use as a recombining network according to the invention.

FIG. 3 illustrates one embodiment of recombining network 350 in the form of a Butler (factorial) array matrix having 100% circuit efficiency. Recombining network 350 has input ports 1, 2, 3 and 4, linked by phase shifters 351 and couplers $C_{11}$, $C_{12}$, $C_{13}$, $C_{21}$ and $C_{22}$ to output ports A and B. This forms a four element, two beam matrix. Providing signals of phase $E_{11}$, $E_{12}$, $E_{13}$ and $E_{14}$ to input ports 1–4, respectively, will result in illuminating output port A. On the other hand, providing signals of phase $E_{21}$, $E_{22}$, $E_{23}$ and $E_{24}$ to input ports 1–4, respectively, will result in illumination of the output port B. For a more detailed description of the operation of such arrays see *Microwave Scanning Antennas* edited by R. C. Hansen, Chapter 3, Academic Press, 1966.

For example, a data antenna may be connected to output port A and an OCI antenna to output port B. During OCI cycles, main BSU places switches 305c–308c in the UP position and provides signals to the input ports 1–4 having phases $E_{21}$, $E_{22}$, $E_{23}$ and $E_{24}$, respectively. During data cycles, main BSU 309 places switches 305c–308c in the UP position and provides signals to the input ports 1–4 of recombining network 350 at the phases $E_{11}$, $E_{12}$, $E_{13}$, $E_{14}$, respectively. This results in illumination of only port A and transmission of such information by the data antenna. The selection of the data and OCI antennas, therefore, does not depend upon any single rf switch.

Figure 4:
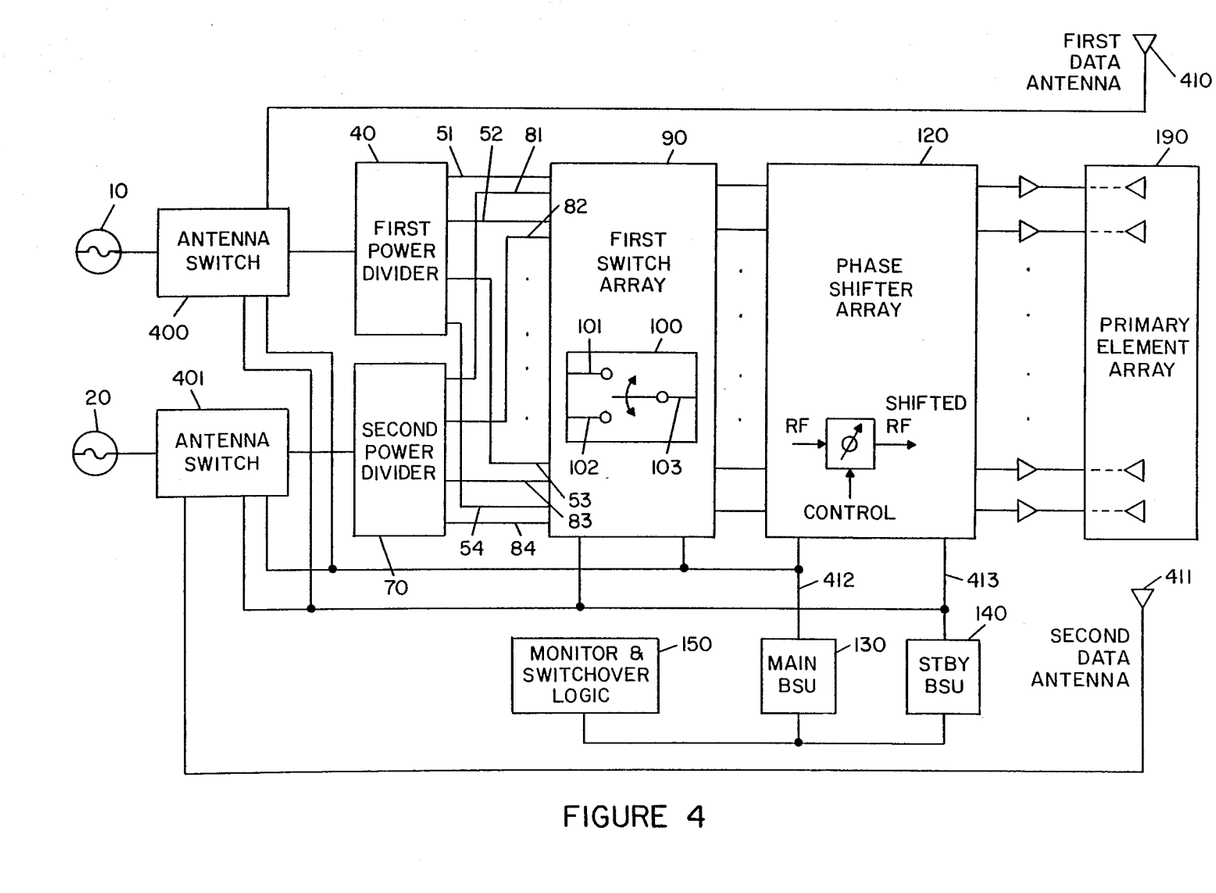
FIG. 4 is a functional block diagram of a microwave landing system (MLS) according to the invention including dual signal sources and antenna switches for supplying dual auxiliary antennas.
Figure 5:
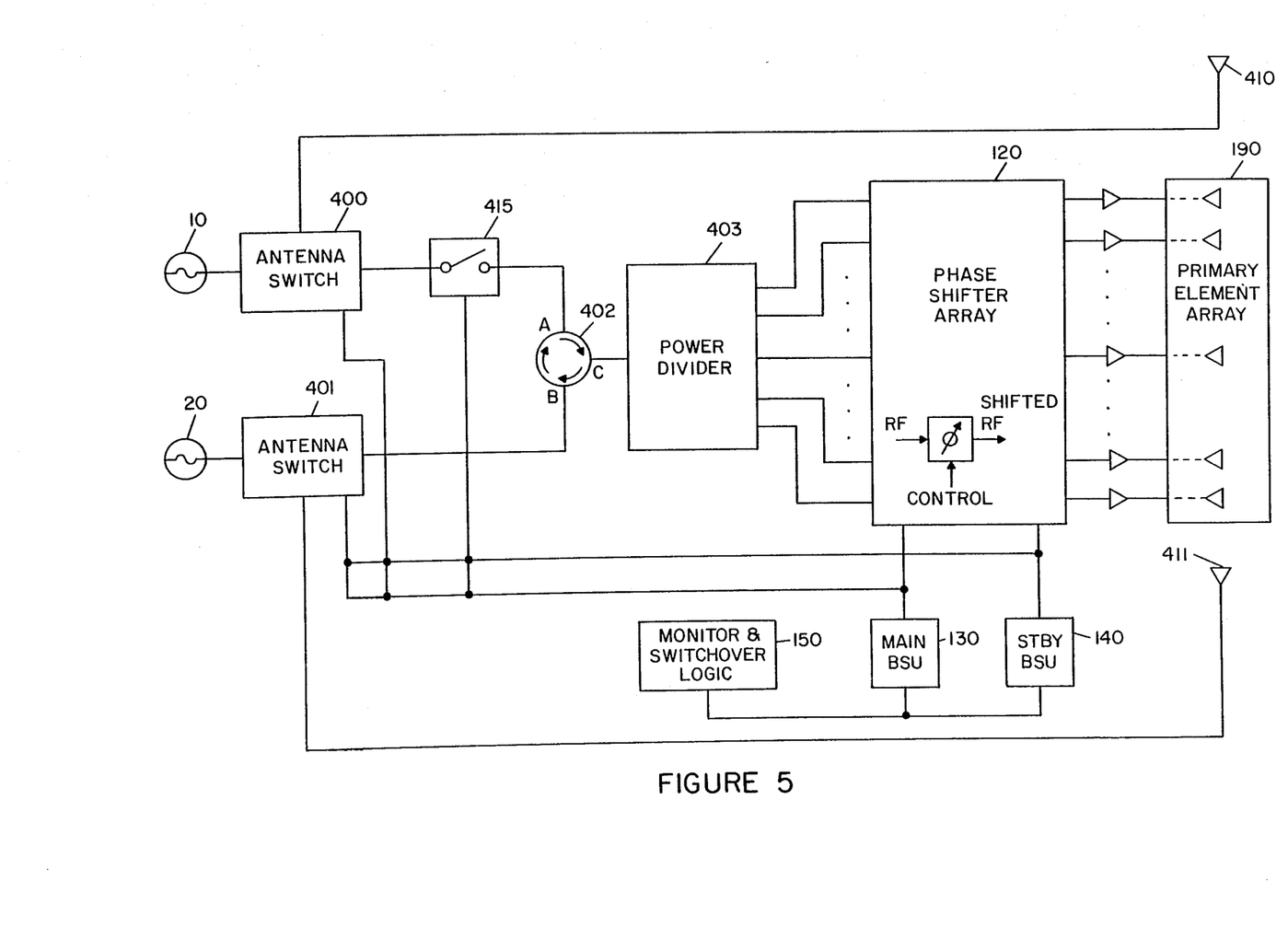
FIG. 5 is a functional block diagram of an MLS according to the invention including dual signal sources fed through a circulator and antenna switches for supplying dual auxiliary antennas.
Figure 6:
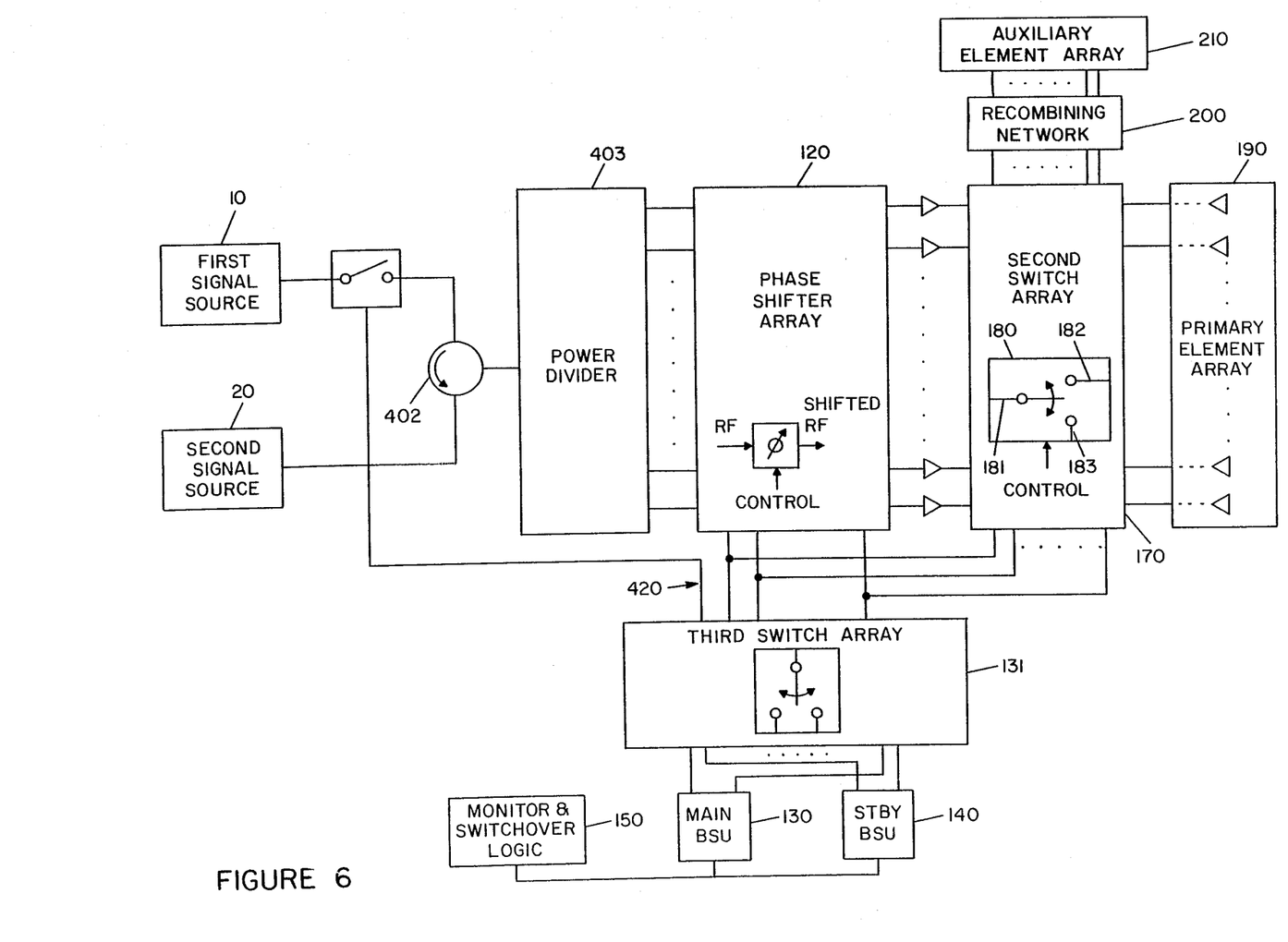
FIG. 6 is a functional block diagram of an MLS according to the invention including dual signal sources fed through a circulator and a recombining network for driving auxiliary antennas.

FIGS. 4, 5 and 6 illustrate various alternative embodiments of the invention. The same reference characters have been used for the same structure which appears in FIGS. 1, 4, 5 and 6.

In FIG. 4, the recombining network becomes unnecessary if the data antenna is the only auxiliary antenna which is considered critical to the operation of the system. Antenna switch 400 is located between power source 10 and first power divider 40. A second antenna switch 401 is located between power source 20 and second power divider 70. During auxiliary modes of operation, the controlling beam steering unit activates the appropriate antenna switch to provide a signal for radiation by the selected data antenna. During normal operation in the scanning mode, antenna switch 400 would connect power supply 10 to first power divider 40. During normal operation in the auxiliary mode, antenna switch 400 would connect power supply 10 to first data antenna 411. During the back-up scanning mode, antenna switch 401 would connect power supply 20 to second power divider 70. During back-up operation of the auxiliary mode, power supply 20 would be connected to second data antenna 411 via antenna switch 401. In FIG. 4, main BSU 130 is shown as having control bus 412 connected to phase shifter array 120, first switch array 90 and antenna switches 400 and 401 to control the operation of these subsystems. Similarly, standby BSU 140 is connected by standby bus 413 to the same subsystems. Alternatively, the main BSU 130 and standby BSU 140 may be connected to the subsystems via a third switch array as illustrated in FIG. 1 or by an array of OR gates or other logic circuits which would function as switches.

FIG. 5 illustrates another alternative embodiment of the invention in which a passive ferrite circulator 402 is used to interconnect the alternative power sources to power divider 403. Circulator 402 is a standard passive ferromagnetic device such as a passive waveguide junction. Each port A, B, C of circulator 402 is related to the other such that when power is fed to any one port, it is transferred to the next port as indicated by the arrow. The invention as illustrated in FIG. 5 would be useful when it is unnecessary to employ switching arrays such as switching array 90, 131 or 170. Although circulator 402 and power divider 403 can be considered single point failures, both these devices are passive and have a very high reliability rate.

In the normal scanning mode, antenna switch 400 would connect power supply 10 to circulator port A. Single pole, single throw switch 415 would be closed so that the circulator would transfer power from port A to port C which is connected to power divider 403. During normal operation of the auxiliary mode, antenna switch 400 would connect power supply 10 to first data antenna 410. During back-up operation in the scanning mode, power supply 20 would be connected to power divider 403 via antenna switch 401 and circulator 402. Switch 415 would be open so that the circulator would view port A as an open circuit and would transfer the power supplied to port B to port C by bypassing port B. In the back-up auxiliary mode, antenna switch 401 would interconnect second data antenna 411 to power supply 20.

A short circuit failure of switch 415 does not cause a signal critical failure because it continues to connect primary power source 10 to power divider 403 via circulator 402. An open circuit failure of switch 415 would automatically cause switchover to the back-up supply 20 which in fact requires an open circuit switch 415 to transfer the amplified carrier to the array power divider 403. Therefore, the combination of circulator 402 and switch 415 provide a fail-operational configuration.

FIG. 6 illustrates another alternative embodiment of the invention wherein circulator 402 is used in the same manner as FIG. 5 to alternatively connect the signal sources to power divider 403. In addition, second switching array 170 and third switch array 131 are used as described above.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed:

1. An antenna system for radiating wave energy signals into a selected region of space and in a desired radiation pattern, said system comprising:
   (a) an aperture comprising an array of antenna elements;
   (b) first means for supplying a plurality of first wave energy signals;
   (c) second means, independent of said first means, for supplying a like plurality of second wave energy signals substantially the same as said first wave energy signals;
   (d) third means for selectively coupling either said plurality of first wave energy signals or said plurality of second wave energy signals to the antenna elements; and
   (e) fourth means for scanning a beam radiated by the array in accordance with a predetermined pattern, said beam resulting from the supplied wave energy signals coupled to the antenna elements.

2. The antenna system of claim 1 further including means for amplifying each of the supplied wave energy signals provided by the fourth means.

3. The antenna system of claim 2 wherein said means for amplifying comprises a distributed array of amplifiers, one associated with each of the supplied wave energy signals provided by the fourth means, said amplifiers for amplifying the associated signal.

4. The antenna system of claim 1 wherein said third means comprises a first array of switches, each said switch having an output associated with the fourth means, each said switch having first and second inputs; the first input being coupled to the means for supplying first wave energy signals; the second input being coupled to the means for supplying second wave energy signals.

5. The antenna system of claim 1 further comprising:
first and second auxiliary apertures;
seventh means for selectively coupling said first wave energy signals to said first auxiliary aperture; and
eighth means for selectively coupling said second wave energy signals to said second auxiliary aperture.

6. The antenna system of claim 5 wherein said first auxiliary aperture comprises a first data antenna; said second auxiliary aperture comprises a second data antenna; said fourth means comprises a first antenna switch coupled between said first means and said third means for selectively coupling said first wave energy signals to said first data antenna; and said fifth means comprises a second antenna switch coupled between said second means and said third means for selectively coupling said second wave energy signals to said second data antenna.

7. The antenna system of claim 6 wherein said third means comprises a first array of switches, each said switch having an output associated with the fourth means, each said switch having first and second inputs; the first input being coupled to the means for supplying first wave energy signals; the second input being coupled to the means for supplying second wave energy signals.

8. An antenna system for radiating wave nergy signals into a selected region of space and in desired radiation pattern, said system comprising:
(a) means for supplying a plurality of wave energy signals;
(b) a primary aperture comprising a primary array of primary antenna elements;
(c) an auxiliary aperture comprising an auxiliary array of auxiliary antennas;
(d) recombing means for recombing supplied wave energy signals and for supplying the recombined signals to the auxiliary aperture;
(e) first means for phase shifting supplied wave energy signals;
(f) second means for selectively coupling said phase shifted wave energy signals provided by the first means to either the primary antenna elements or the recombining means;
(g) said first means providing a beam radiated by the primary array in accordance with a predetermined pattern when said second means couples said phase shifted signals to the primary array; and
(h) said first means providing a beam radiated by at least one of said auxiliary antennas when said second means couples said phase shifted signals to said recombing means.

9. The antenna system of claim 8 wherein said recombining means comprises a recombining network having a plurality of inputs equal to the number of primary antenna elements and having outputs, each one connected to only one of the auxiliary antennas.

10. The antenna system of claim 8 wherein said means for supplying comprises: means for supplying a plurality of first wave energy signals; means for supplying a like plurality of second wave energy signals substantially the same as said plurality of first wave energy signals; and third means for selectively coupling either said plurality of first wave energy signals or said plurality of second wave energy signals to said first means.

11. The antenna system of claim 10 wherein said third means comprises a first array of switches, each said switch having an output coupled to the first means, each said switch having first and second inputs; the first input being coupled to the means for supplying first wave energy signals; the second input being coupled to the means for supplying second wave energy signals.

12. The antenna system of claim 8 wherein said first means comprises: an array of phase shifters, each having a control port; a first beam steering unit for controlling said phase shifters; a second beam steering unit for controlling said shifters; and fourth means for selectively coupling either said first beam steering unit or said second beam steering unit to the control ports of said phase shifters.

13. The antenna system of claim 12 wherein said fourth means comprises a second array of switches, each said switch having an output coupled to a control port of a phase shifter of the array of phase shifters, each said switch having first and second inputs; the first input being coupled to the first beam steering unit and the second input being coupled to the second beam steering unit.

14. The antenna system of claim 8 wherein said second means comprises a third array of switches, each said switch having an input coupled to the first means; each said switch having first and second outputs, the first output being coupled to a corresponding one of said primary antenna elements and the second output being coupled to a corresponding input of said recombining means.

15. The antenna system of claim 14 wherein said means for supplying comprises: means for supplying a plurality of first wave energy signals; means for supplying a like plurality of second wave energy signals substantially the same as said plurality of first wave energy signals; and third means for selectively coupling either said first wave energy signals or said second wave energy signals to said first means.

16. The antenna system of claim 15 wherein said first means comprises: an array of phase shifters, each having a control port; a first beam steering unit for controlling said phase shifters; a second beam steering unit for controlling said shifters; and fourth means for selectively coupling either said first beam steering unit or said second beam steering unit to the control ports of said phase shifters.

17. The antenna system of claim 16 wherein said recombining means comprises a recombining network having a plurality of inputs equal to the number of primary antenna elements and having outputs, each one coupled to a corresponding one of the auxiliary antennas.

18. The antenna system of claim 17 wherein said third means comprises a first array of switches, each said switch having an output coupled to the first means, each said switch having first and second inputs; the first input being coupled to the means for supplying first wave energy signals; the second input being coupled to the means for supplying second wave energy signals.

19. The antenna system of claim 18 wherein said fourth means comprises a second array of switches, each said switch having an output coupled to a control port of a phase shifter of the array of phase shifters, each said switch having first and second inputs; the first input being coupled to the first beam steering unit and the second input being coupled to the second beam steering unit.

20. The antenna system of claim 19 further including means for amplifying each of the phase shifted, supplied wave energy signals provided by the first means.

21. The antenna system of claim 20 wherein said means for amplifying comprises a distributed array of amplifiers, one associated with each of the phase shifted, supplied wave energy signals provided by the first means, said amplifiers for amplifying the associated signals.

22. The antenna system of claim 8 further including means for amplifying each of the phase shifted, supplied wave energy signals provided by the first means.

23. The antenna system of claim 22 wherein said means for amplifying comprises a distributed array of amplifiers, one associated with each of the phase shifted, supplied wave energy signals provided by the first means, said amplifiers for amplifying the associated signals.

24. An antenna system for radiating wave energy signals into a selected region of space and in a desired radiation pattern, said system comprising:
(a) a primary aperture comprising a primary array of antenna elements;
(b) an auxiliary aperture comprising an auxiliary array of auxiliary antenna elements;
(c) recombining means for recombining a plurality of supplied wave energy signals and for supplying the recombined signals to said auxiliary aperture;
(d) first means for supplying a plurality of first wave energy signals;
(e) second means, independent of said first means, for supplying a like plurality of second wave energy signals substantially the same as said first wave energy signals;
(f) third means for selectively supplying either said plurality of first wave energy signals or said plurality of second wave energy signals;
(g) fourth means for scanning a beam radiated by said array in accordance with a predetermined pattern, said fourth means comprising means for phase shifting a plurality of supplied wave energy signals; and
(h) fifth means for selectively coupling said plurality of phase shifted signals to either the primary antenna elements or the recombining means.

25. The antenna system of claim 24 wherein said third means comprises a first array of switches, each said switch having an output associated with the first means, each said switch having first and second inputs; the first input being coupled to the means for supplying a plurality of first wave energy signals; the second input being coupled to the means for supplying a plurality of second wave energy signals.

26. The antenna system of claim 25 wherein said recombining means comprises a recombining network having a plurality of inputs equal to the number of primary antenna elements and having outputs, each one connected to only one of the auxiliary antenna.

27. The antenna system of claim 26 wherein said fourth means comprises: an array of phase shifters; a first beam steering unit for controlling said phase shifters; a second beam steering unit for controlling said phase shifters; and sixth means for selectively coupling either said first beam steering unit or said second beam steering unit to said array of phase shifters.

28. The antenna system of claim 27 wherein said sixth means comprises a second array of switches, each said switch having an output coupled to a control port of a phase shifter of the array of phase shifters, each said switch having first and second inputs; the first input being coupled to the first beam steering unit and the second input being coupled to the second beam steering unit.

29. The antenna system of claim 28 wherein said fifth means comprises a third array of switches, each said switch having an input coupled to the first means; each said switch having first and second outputs, the first output being coupled to a corresponding primary antenna element and the second output being coupled to a corresponding input of the recombining means.

30. The antenna system of claim 29 wherein said first means for supplying wave energy signals comprises a first signal source and a first power divider associated therewith and said second means for supplying wave energy signals comprises a second signal source, independent of said first signal source, and a second power divider associated therewith.

31. The antenna system of claim 28 further including means for amplifying each of the supplied wave energy signals provided by the fourth means.

32. The antenna system of claim 31 wherein said means for amplifying comprises a distributed array of amplifiers, one associated with each of the supplied wave energy signals provided by the fourth means, said amplifiers for amplifying the associated signal.

33. The antenna system of claim 24 wherein said fifth means comprises a third array of switches, each said switch having an input coupled to the first means; each said switch having first and second outputs, the first output being coupled to a corresponding primary antenna element and the second output being coupled to a corresponding input of the recombining means.

34. The antenna system of claim 24 wherein said recombining means comprises a recombining network having a plurality of inputs equal to the number of primary antenna elements and having outputs, each output being coupled to only a corresponding one of the auxiliary antennas.

35. An antenna system for radiating wave energy signals into a selected region of space and in a desired radiation pattern, said system comprising:
(a) an aperture comprising an array of antenna elements;
(b) first means for supplying a plurality of first wave energy signals;
(c) second means, independent of said first means, for supplying a like plurality of second wave energy signals substantially the same as said first wave energy signals;
(d) third means for selectively coupling either said plurality of first wave energy signals or said plurality of second wave energy signals to said antenna elements; and (e) fourth means for scanning a beam radiated by said array in accordance with a predetermined pattern, said fourth means comprising: an array of phase shifters, each having a control port; a first beam steering unit for controlling said phase shifters; a second beam steering unit for controlling said phase shifters; and means for selectively coupling either said first beam steering unit or said second beam steering unit to the control ports of said phase shifters.

36. The antenna system of claim 35 wherein said sixth means comprises a second array of switches, each said switch having an output coupled to a control port of a corresponding phase shifter of the array of phase shifters, each said switch having first and second inputs; the first input being coupled to the first beam steering unit and the second input being coupled to the second beam steering unit.

37. An antenna system for radiating wave energy signals into a selected region of space and in a desired radiation pattern, comprising:
(a) a primary aperture comprising an array of antenna elements;
(b) a first data antenna;
(c) a second data antenna;
(d) first means for supplying a first wave energy signal;
(e) second means, independent of said first means, for supplying a second wave energy signal substantially the same as said first wave energy signal;
(f) a circulator having first and second inputs and an output;
(g) a first antenna switch having an input and a pair of outputs, said first wave energy signals being supplied to said input, one of said outputs being coupled to said first data antenna and the other of said outputs being coupled to the first input of said circulator;
(h) a second antenna switch having an input and a pair of outputs, said second wave energy signals being supplied to said input, one of said outputs being coupled to said second data antenna and the other of said outputs being coupled to the second input of said circulator;
(i) means for controlling said antenna switches to selectively couple said first and second wave energy signals to said first and second data antennas or to said circulator; and
(j) means for scanning a beam radiated by said primary aperture in accordance with a predetermined pattern, said means comprising a power divider having an input coupled to the output of said circulator and having a plurality of outputs associated with the antenna elements of said primary aperture.

* * * * *

UNITED STATES PATENT AND TRADEMARK OFFICE
CERTIFICATE OF CORRECTION

PATENT NO. : 4,837,580

DATED : June 6, 1989

INVENTOR(S) : Richard F. Frazita, et al

Page 1 of 2

It is certified that error appears in the above-identified patent and that said Letters Patent is hereby corrected as shown below:

On the title page under United States Patent Item (19), "Frazita" should read --Frazita et al--.

Inventor should read
--(75) Inventors: Richard F. Frazita, St. James, N.Y.;
Paul H. Feldman, Commack, N.Y. --.

Fig. 6 should be deleted to be replaced with Fig. 6 as shown on the attached sheet.

Signed and Sealed this

Twenty-seventh Day of February, 1990

Attest:

JEFFREY M. SAMUELS

*Attesting Officer*    *Acting Commissioner of Patents and Trademarks*

FIGURE 6